United States Patent [19]
Cutforth et al.

[11] 3,821,042
[45] June 28, 1974

[54] COMPOSITE PROPELLANT CONTAINING MOLYBDENUM TO REDUCE ELECTROMAGNETIC RADIATION INTERFERENCE IN COMBUSTION PRODUCTS

[75] Inventors: Howard G. Cutforth, Los Altos; Clarence A. Le Febvre; Melvin E. Steinle, both of San Jose, all of Calif.

[73] Assignee: United Aircraft Corporation, East Hartford, Conn.

[22] Filed: July 31, 1967

[21] Appl. No.: 657,001

[52] U.S. Cl................ 149/19.4, 149/20, 149/19.5, 149/19.6, 149/19.7, 149/19.91
[51] Int. Cl............................................... C06d 5/06

[58] Field of Search................ 149/114, 19, 20, 44; 60/219

[56] References Cited
UNITED STATES PATENTS

| | | | |
|---|---|---|---|
| 2,935,394 | 5/1960 | Hiler | 149/114 X |
| 3,022,149 | 2/1962 | Cramer | 149/19 |
| 3,026,672 | 3/1962 | Sammons | 60/219 |
| 3,118,275 | 1/1964 | McLain et al. | 60/219 |
| 3,147,161 | 9/1964 | Abere et al. | 149/19 |
| 3,167,525 | 1/1965 | Thomas | 149/87 X |

*Primary Examiner*—Benjamin R. Padgett

[57] ABSTRACT

Solid propellant compositions containing molybdenum exhibit improved castability characteristics and when burned exhibit substantially lower radar interference.

2 Claims, No Drawings

COMPOSITE PROPELLANT CONTAINING MOLYBDENUM TO REDUCE ELECTROMAGNETIC RADIATION INTERFERENCE IN COMBUSTION PRODUCTS

BACKGROUND OF THE INVENTION

Composite solid propellant grains for use in either solid propellant or hybrid rocket motors consist of a polymeric binder having a high solids loading of particulate materials such as oxidizer particles, particles of combustible materials such as aluminum, boron, and various metal hydrides, for example, and various burning rate modifiers such as iron oxide, for example. Generally, higher performance is obtained at higher solids loadings, however, at high solids loading, the viscosity of the uncured propellant mix increases to the point where the material can no longer be cast into suitable molds to form grains of the desired configuration.

Another and unrelated problem also exists with respect to the affect of the exhaust gas stream, in many rocket propulsion systems, on electromagnetic radiation. It has been found that the exhaust gas interferes with electromagnetic radiation, particularly in the high frequency ranges used by the ground control and airborne control radio and radar systems. The interference is characterized by both attenuation and modulation of the electromagnetic signals. The interference produced in these signals by the exhaust stream adversely affects the reception and transmission of guidance and control signals of a rocket propelled vehicle and can cause the vehicle to go off course as a result of loss or misinterpretation of the control signals. According to this invention it has been discovered that the inclusion of small amounts of metallic molybdenum in the uncured propellant mix substantially increase the flowability of the mix and further that solid propellant compositions containing molybdenum produce exhaust gas streams having greatly reduced radar interference characteristics without substantially affecting the performance of the propellant.

It is accordingly an object of this invention to provide a solid propellant composition containing metallic molybdenum.

It is another object of this invention to provide a method for improving the castability of an uncured composite solid propellant mix.

It is another object of this invention to provide an agent for reducing the viscosity of a viscous liquid loaded with solid particles.

It is another object of this invention to reduce the interference with electromagnetic radiation of a rocket motor exhaust.

These and other objects of this invention will be readily apparent from the following description of this invention.

DESCRIPTION OF THE INVENTION

According to this invention the addition of molybdenum to solid propellants has been found to produce desirable effects on both castability and electromagnetic interference. When considering the castability characteristics alone, the molybdenum appears to be acting as a surface active agent and marked reductions in viscosity have been observed with as low as 0.05 percent by weight of molybdenum in the propellant. The affect of molybdenum on the castability does not appear to be linear and while castability tends to improve with the amount of molybdenum present, use of more than about 1 percent by weight of molybdenum is usually not justified by a sufficient improvement in the castability.

When affects on interference are considered, however, it has been observed that it is preferable to employ larger amounts of molybdenum than are used to improve castability. Thus, while some reduction in interference is obtained with even minute amounts of molybdenum, substantial improvement is obtained at about 0.25 percent by weight of molybdenum and the affects increase with the amount of molybdenum present. It is preferred, however, to operate below about 5 percent molybdenum since a trade-off must be made between reduced interference and the reduced specific impulse which occurs when molybdenum is substituted for other propellant ingredients that have higher specific impulses. It should be noted, however, that this effect is partially offset by the higher total solids loading and higher density permitted as a result of the affects of the molybdenum on the castability.

The molybdenum employed according to this invention should have a particle size below about 15 micron and preferably below about 10 micron. The particle size limitation is primarily dictated by the castability effects. The affect on interference is not particularly sensitive to particle size although more efficient utilization of the molybdenum is obtained when finely divided particles are employed.

The molybdenum is effective in increasing the flowability of many viscous liquids such as polybutadienes, polyethylenes, polyisobutylenes, polybutadiene-acrylonitrile copolymers, polyvinyl chlorides, polyesters, polyethers, polyurethanes, epoxy resins, and natural rubber, for example, which have solid particles dispersed therethrough, and many of these materials are used in the fabrication of composite solid propellant grains.

Composite solid propellant grains are formed by mixing the uncured polymer with various particulate materials known to the art which include inorganic oxidizing salts such as ammonium nitrate, ammonium perchlorate, nitronium perchlorate and high energy solid fuel materials which include aluminum, magnesium, boron, boron hydrides, and high energy heterocyclic nitrogen compounds. Burning rate catalysts such as iron oxide, ferrocene, and ferrocene derivatives are also commonly included in the mix. The uncured polymer and the additives are mixed to provide a uniform dispersion thereof, a curing agent for the polymer is added to the mix and dispersed therethrough and the propellant is cast into the form of a grain and heated to cure the polymer. Solid propellant grains so formed may be either monopropellant grains or hybrid propellant grains. The primary distinction being that a monopropellant grain is capable of self-sustained combustion whereas a hybrid propellant grain is deficient in oxidizer or fuel, usually oxidizer, so that it is incapable of efficient self-sustained combustion. It should be noted that in preparing propellants producing low interference exhausts, it is important to maintain the propellant composition as free as possible of alkali metal constituents. Although castability and attenuation are not normally problems encountered with double base propellants, molybdenum, according to this invention, will function to produce the desired effects in those systems as well as in the composite systems above described.

The affects of the molybdenum are illustrated by the following examples.

EXAMPLE 1

A control and test mix of liquid polymers containing 86 percent by weight of solids dispersed therethrough were prepared according to the following formulations:

TABLE I

|  | Sample 1 | Sample 2 |
|---|---|---|
| Binder* | 14.00% | 14.00% |
| Aluminum | 14.00% | 14.00% |
| Molybdenum**(app. 6 micron) | 00.00% | 00.10% |
| Ammonium Perchlorate (AP) | 71.65% | 71.55% |
| Fe₂O₃ | 00.35% | 00.35 |

*Binder consisted of carboxy-terminated polybutadiene containing a polyfunctional aziridinyl compound and a trifunctional epoxy compound as crosslinking agents and was plasticized with dioctyl adipate.
**Grade 390-325 Sylvania Electronic Products Inc.

The flow rates of these materials at 160° F and at various pressures were determined by means of a rheometer with the following results:

TABLE II

| Formulation | Rheometer Flow Rate, gm/sec at 160°F | | |
|---|---|---|---|
|  | 10 psia | 20 psia | 30 psia |
| 1 | 7.8 | 15.6 | 23.0 |
| 2 | 13.4 | 26.7 | 39.7 |

As can be seen from Table II, the inclusion of molybdenum substantially increased the flow rate of the mix.

EXAMPLE 2

4 pound, centerport propellant grains having the composition by weight set forth in Table III were prepared and fired. The radar attenuation along paths disposed at 90° and 30° to the exhaust stream were measured by directing a radar beam of known intensity through the path of the exhaust stream and measuring the decrease in signal strength caused by the exhaust gases.

As can be seen from Table III, the addition of molybdenum substantially reduced the radar attentuation from that observed in the control sample 1 which contained no molybdenum.

EXAMPLE 3

A 20,000 lb. thrust solid propellant motor containing 1 percent molybdenum was fired and radar attenuation and modulation measured. The observed attenuation and modulation were both substantially less than that observed in a firing, under the same conditions, of a similar motor containing no molybdenum.

While this invention has been disclosed with respect to several examples thereof, these examples are illustrative rather than limiting of the invention. Various modifications will be apparent to workers skilled in the art and can be made without departing from the scope of this invention which is limited only by the following claims wherein:

We claim:

1. A composite solid propellant composition producing, upon combustion, combustion products exhibiting reduced electromagnetic radiation interference, said propellant composition comprising a cured polymeric binder selected from the group consisting of cured polybutadienes, polyisobutylenes, polybutadiene-polystyrene copolymers, polyesters, polyethylenes, polyvinyl chlorides, polyurethanes and epoxy polymers having dispersed therethrough a solid inorganic oxidizing salt and an interference reducing amount of particulate metallic molybdenum, said propellant composition being substantially free of alkali metal constituents.

2. The composition of claim 1 wherein said molybdenum is present in amounts of from 0.25 percent to 5 percent by weight.

TABLE III

| Sample No. | Binder,% | AP,% | Al | Mo | Fe₂O₃ | Radar Attenuation db. | |
|---|---|---|---|---|---|---|---|
|  |  |  |  |  |  | 30° | 90° |
| 1 | 14.00 | 71.65 | 14.00 | 0.00 | .35 | 1.2 | 0.7 |
| 3 | 14.00 | 71.50 | 12.00 | 2.00 | .50 | 0.3 | 0.4 |
| 4 | 14.00 | 71.15 | 14.00 | 0.50 | .35 | 0.8 | 0.6 |
| 5 | 14.00 | 71.40 | 14.00 | 0.25 | .35 | 0.8 | 0.6 |
| 6 | 14.00 | 70.65 | 14.00 | 1.00 | .35 | 0.6 | 0.6 |
| 7 | 14.00 | 70.65 (pure) | 14.00 | 1.00 | .35 | 0.4 | 0.2 |
| 8 | 14.00 | 69.65 | 14.00 | 2.00 | .35 | 0.4 | 0.5 |
| 9 | 14.00 | 71.90 | 13.00 | 1.00 | .10 | 0.4 | 0.3 |

Pure AP has a total of 10 ppm N₀+K
Regular AP has between 120-500 ppm N₀+K

* * * * *